US012620018B2

(12) United States Patent
Lee et al.

(10) Patent No.: US 12,620,018 B2
(45) Date of Patent: May 5, 2026

(54) SYSTEM FOR DOCKING VEHICLE TO BUILDING AND CONTROL METHOD OF THE SAME

(71) Applicants: HYUNDAI MOTOR COMPANY, Seoul (KR); KIA CORPORATION, Seoul (KR)

(72) Inventors: Sang Heon Lee, Seoul (KR); Jin Ho Hwang, Cheonan-si (KR); Dong Eun Cha, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/788,378

(22) Filed: Jul. 30, 2024

(65) Prior Publication Data

US 2024/0386480 A1     Nov. 21, 2024

Related U.S. Application Data

(62) Division of application No. 17/036,643, filed on Sep. 29, 2020, now Pat. No. 12,086,873.

(30) Foreign Application Priority Data

Apr. 21, 2020     (KR) ........................ 10-2020-0047838

(51) Int. Cl.
| | |
|---|---|
| *G06Q 30/0645* | (2023.01) |
| *E04H 6/18* | (2006.01) |
| *B65G 69/00* | (2006.01) |

(52) U.S. Cl.
CPC ......... *G06Q 30/0645* (2013.01); *E04H 6/188* (2013.01); *B65G 69/008* (2013.01)

(58) Field of Classification Search
None
See application file for complete search history.

(56) References Cited

U.S. PATENT DOCUMENTS

| | | | |
|---|---|---|---|
| 3,744,739 A | 7/1973 | Weaver et al. | |
| 4,389,821 A | 6/1983 | O'Neal | |
| | (Continued) | | |

FOREIGN PATENT DOCUMENTS

| | | |
|---|---|---|
| CN | 105825707 A | 8/2016 |
| CN | 206987482 U | 2/2018 |
| | (Continued) | |

OTHER PUBLICATIONS

"The 8 different types of loading docks" (Year: 2018).*
(Continued)

*Primary Examiner* — Dennis W Ruhl
(74) *Attorney, Agent, or Firm* — Morgan, Lewis & Bockius LLP

(57)     ABSTRACT

A system for docking a vehicle to a building, wherein the vehicle functions as a space of the building when the vehicle is connected thereto, and wherein the building includes at least one station inside or outside thereof such that the vehicle can dock at the at least one station, includes a server configured to check whether the at least one station is available to allow a user to select a station for a vehicle, to select the station randomly when the user does not select the station, and when the vehicle is docked at the selected station, to connect the vehicle to the selected station in wired or wireless manner to manage use of the selected station.

8 Claims, 7 Drawing Sheets

(56) References Cited

U.S. PATENT DOCUMENTS

| | | | |
|---|---|---|---|
| 5,953,868 A | 9/1999 | Giuliani et al. | |
| 10,494,205 B1 | 12/2019 | Hoofard et al. | |
| 2002/0029164 A1 | 3/2002 | Sugar et al. | |
| 2002/0045420 A1 | 4/2002 | Taillon | |
| 2004/0037678 A1 | 2/2004 | Bonin | |
| 2006/0219448 A1 | 10/2006 | Grieve et al. | |
| 2007/0260473 A1 | 11/2007 | Cornacchia | |
| 2008/0302029 A1 | 12/2008 | Desjardins | |
| 2010/0086385 A1 * | 4/2010 | Shani | E04H 6/245 |
| | | | 414/800 |
| 2011/0114398 A1 | 5/2011 | Bianco | |
| 2012/0245966 A1 | 9/2012 | Volz | |
| 2017/0101025 A1 | 4/2017 | Penilla et al. | |

FOREIGN PATENT DOCUMENTS

| | | | |
|---|---|---|---|
| CN | 110689756 A | 1/2020 | |
| DE | 101 26 193 C1 | 10/2002 | |
| EP | 1708348 A1 | 10/2006 | |
| EP | 3564877 A1 | 11/2019 | |
| JP | 8-81066 A | 3/1996 | |
| JP | H09-183334 A | 7/1997 | |
| JP | 2001-163453 A | 6/2001 | |
| JP | 2001-271500 A | 10/2001 | |
| JP | 2004-246834 A | 9/2004 | |
| JP | 3168031 U | 5/2011 | |
| JP | 2014/0067 41 A | 1/2014 | |
| JP | 5975844 B2 | 7/2016 | |
| JP | 2019-49109 A | 3/2019 | |
| JP | 2020-170563 A | 10/2020 | |
| KR | 10-2016-0029761 A | 3/2016 | |
| KR | 10-2017-0132013 A | 12/2017 | |
| KR | 10-2019-0038766 A | 4/2019 | |
| WO | 96/24503 A1 | 8/1996 | |
| WO | 01/12922 A1 | 2/2001 | |

OTHER PUBLICATIONS

Office Action issued on Jun. 7, 2024 in corresponding European patent application No. 20199979.4.

Office Action issued on Apr. 2, 2024 in Japanese Patent Application No. 2020-166332.

Korean Office Action dated Mar. 29, 2021 issued in Korean Patent Application No. 10-2020-0047838.

Extended European Search Report dated Nov. 6, 2020 issued in European Patent Application No. 20199979.4.

Office Action issued on Jan. 27, 2025 in corresponding Chinese patent application No. 202011157356.8 with English translation.

Refusal Decision issued on Mar. 18, 2026 in European Patent Application No. 20199979.4.

* cited by examiner

SYSTEM FOR DOCKING VEHICLE TO BUILDING AND CONTROL METHOD OF THE SAME

CROSS REFERENCE TO RELATED APPLICATION

This application is the divisional application of U.S. patent application Ser. No. 17/036,643 filed on Sep. 29, 2020, which claims priority to Korean Patent Application No. 10-2020-0047838, filed Apr. 21, 2020 in the Korean Intellectual Property Office, the entire contents of which is incorporated herein for all purposes by this reference.

TECHNICAL FIELD

The present disclosure relates to an office system and a control method thereof, capable of connecting a vehicle to a building by docking at a station provided in the building to allow an interior space of the vehicle to communicate with the building so as to operate the vehicle as a part of the building.

BACKGROUND

Generally, an office building has a room or space available according to a specific purpose for a user or users. In the case of a company building, an employer may prepare an office room for an employee to work therein. Further, in the case of a commercial building, a building owner may install facilities in each space to rent the space and decorate an interior thereof to be suitable for a purpose.

The above-described office system having traditional concept however has many limitations. For example, it is difficult to reflect an individual's taste for each space, and when a space is once equipped with the facilities, it requires a lot of money and time to change the facilities. Further, it is difficult to operate a space flexibly according to various changes in environment. That is, since each room and space of the building is provided to perform a specific purpose, it is difficult to use each room and space for any purpose other than the specific purpose. This incurs unnecessary space maintenance costs and thus increases rent.

Accordingly, it is necessary to develop an office system that allows a specific space to be used according to the user's intention, and when the specific space is not in use, to allow the specific space to be used by other users for other purposes. The present disclosure relates to an office system and a control method thereof in which a vehicle and a building are flexibly connected to each other so that the vehicle functions as a part of the building, and proposes a new model of the office system.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made keeping in mind the above problems occurring in the related art, and the present disclosure is intended to propose an office system, wherein a building has a station, and a vehicle may be docked at the station to occupy and use a specific space of the building and the vehicle may be separated from the station when the use of the space is finished.

In order to achieve the above objectives, according to one aspect of the present disclosure, A system for docking a vehicle to a building, wherein the vehicle functions as a space of the building when the vehicle is connected thereto, and wherein the building includes at least one station inside or outside thereof such that the vehicle can dock at the at least one station, includes and a server configured to check whether the station may be available or not to allow a user to select a station for a vehicle, to select the station randomly when the user does not select, and when the vehicle is docked at the selected station, to connect the vehicle to the selected station in wired or wireless manner to manage use of the station.

The station may be provided at the outside of the building, and when front and rear parts of the vehicle or side surfaces of the vehicle are docked at the outside of the building, the vehicle may be connected to the server.

The station may be provided at the inside of the building, and when the vehicle is docked at the inside of the building, the vehicle may be connected to the server.

The server may include a processor configured to perform: informing the user of guide information in accordance with a use state of the station, the guide information including whether docking of the vehicle is possible or not, start time and end time of use of the station, and reservation information; managing use of the station, connecting the vehicle to a power outlet and communication systems of the building when the vehicle is docked, and counting the end time of use of the station where the vehicle is docked; calculating a fee according to use time of the user and processing payment; and processing a reservation for use of the station.

The processor may be configured to process a reservation for use of the station on the basis of reservation information input from a user terminal.

The processor may be configured to inform a user terminal of reservation information.

The building may have a common use space provided between a plurality of stations to provide an interior space to be commonly used by users.

The vehicle docked at the station may include a standardized connector, so that the vehicle may be connected to the station by docking the connector at the station.

The building may include a plurality of floors, each floor having a station, and include an elevator that may allow the vehicle to board and move between the floors.

The station may include a gate that may be configured to normally close the station and to move to a bottom of the station when the vehicle is docked so that the station may be opened.

A sealing member may be provided at an exterior wall of the station to seal the station by being in contact with a frame of the docked vehicle.

A control method of the system may include: selecting, by a user, a start time and an end time of use of the selected station to determine use time of the selected station; selecting, by the user, options with respect to a location, a size, and a type of the station; selecting the options randomly when the user does not select; docking the vehicle of the user by authorizing the docking of the vehicle to the selected station; connecting the docked vehicle to a power outlet and communication systems of the building; and separating the vehicle from the selected station after completing end of use.

The control method may include: selecting extension of the use time of the station after the using the station, wherein it may be determined whether the extension of the use time of the station in use is possible or not, and as a result, when the extension is possible, the station may be additionally used, or when the extension is impossible, options for use of another station may be selected.

The control method may include: paying a fee according to the use of the selected station after the selecting the options; and selecting extension of the use time of the station after the using the station, wherein it may be determined whether the extension of the use time of the station in use is possible or not, and as a result, when the extension is possible, the station may be additionally used after paying extra charge, or when the extension is impossible, options for use of another station may be selected.

As described above, in the office system where a vehicle is docked and the control method thereof according to the present disclosure, a station may be provided without having facilities and interior design according to a purpose for each room and space in the building so that the vehicle can occupy and use the station by being docked at the station. Accordingly, construction costs can be reduced, rent can be lowered, and space utilization can be increased.

In addition, management of the station is easy thus the management of the building is easy, and the user can use the building only by preparing the user's own vehicle for the purpose. Accordingly, the user can make business operations more efficient and reduce unnecessary costs.

Further, the user can easily use the office system only by owning a vehicle, and the company's employer can easily manage the time and attendance records of employees.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
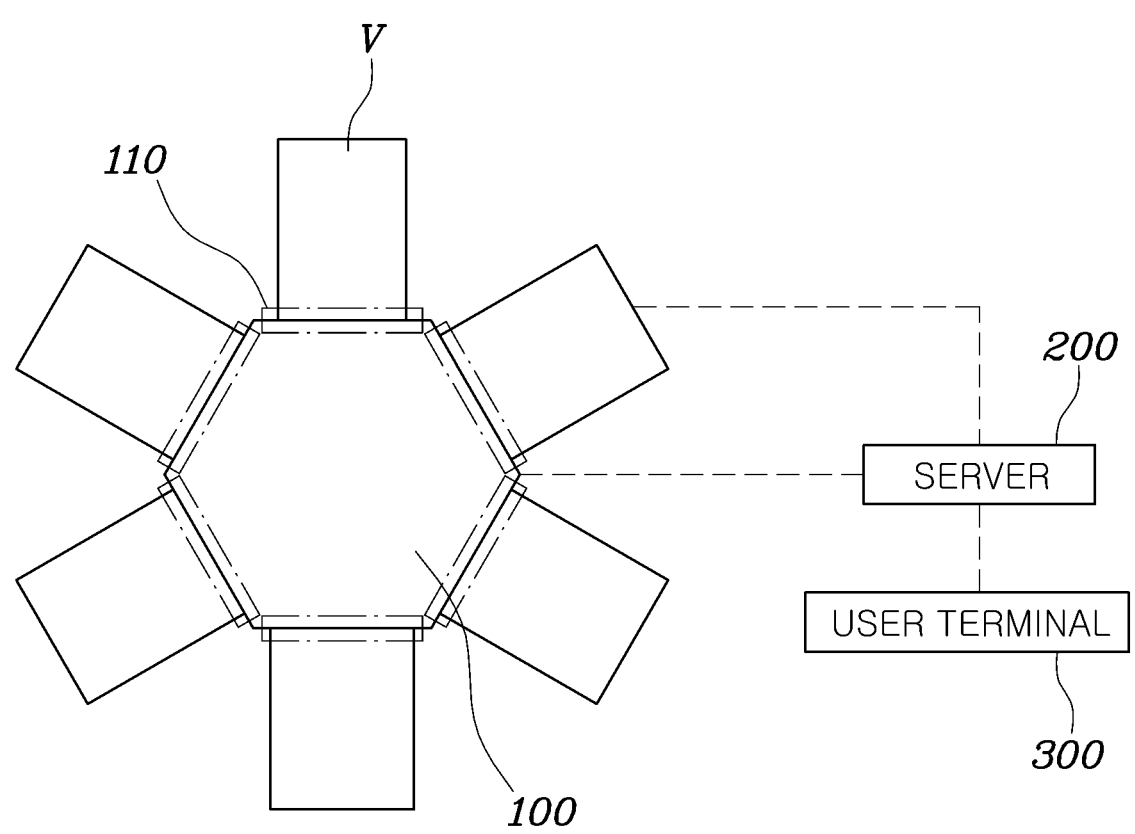
FIG. 1 is a view schematically showing an office system where a vehicle is docked according to an embodiment of the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Hereinafter, exemplary embodiments will be described hereafter in detail with reference to the accompanying drawings. Like reference numerals given in the drawings indicate like components.

The present disclosure relates to an office system, the office system being configured such that a vehicle V is used as a necessary space by being a part of a building 100 when the vehicle Vis docked at and connected thereto, and the vehicle V docked at the building 100 can be managed by a server 200. Rather than providing a room for a specific purpose in a divided space of the building 100, the vehicle V docked at each station 110 becomes a room of the building 100, so that excellent space utilization may be secured.

FIG. 1 is a view schematically showing an office system where a vehicle is docked according to an embodiment of the present disclosure. Referring to FIG. 1, the office system where the vehicle V is docked according to an embodiment of the present disclosure may include the station 110 and the server 200.

The station 110 may be provided at one side of the building 100 where the vehicle V may be docked. The vehicle V may have an interior space that can be used as an office or a sales office, such as a Purpose Built Vehicle (PBV). The station 110 may be provided with a gate 112, and the gate 112 is normally closed when the vehicle V is not docked, and the gate 112 opens the inside of the station 110 when the vehicle V is docked and connected to the station 110 to connect the interior space of the vehicle V to the building 100 (see FIG. 5). The vehicle V may have a standardized connector, and as the connector is docked at the station 110, the building 100 and the vehicle V may be connected to each other. Accordingly, standards of the station 110 and the connector may be standardized and used universally.

The server 200 may check whether the use of the station 110 is possible in accordance with whether the vehicle V is docked at the station 110 or whether the station 110 is reserved in advance, and by allowing a user to select the station 110 of the vehicle V, the user can select the desired station 110. Alternately, when the user does not select the station 110, the server 200 may select the station 110 randomly.

When the vehicle V is docked at the selected station 110, the server 200 may be connected to the vehicle V with wire or wirelessly to manage the use of the station 110 of the user.

The user can reserve or select the station 110 through a user terminal 300, and pay a fee while receiving service information. To this end, the user terminal 300 may be connected to the building 100 and the server 200 by communication. A dedicated application that may be connected to the server 200 may be installed and used in the user terminal 300.

As shown in FIG. 1, the station 110 may be provided at the outside of the building 100, and front and rear parts of the vehicle V may be docked at the outside of the building 100. Alternately, unlike FIG. 1, a side surface of the vehicle V may be connected to the outside of the building 100. In this case, the vehicle V functions as a part of the building 100 such that the interior space of the vehicle communicates with the building 100 while the vehicle V is parked outside the building 100.

Figure 2:
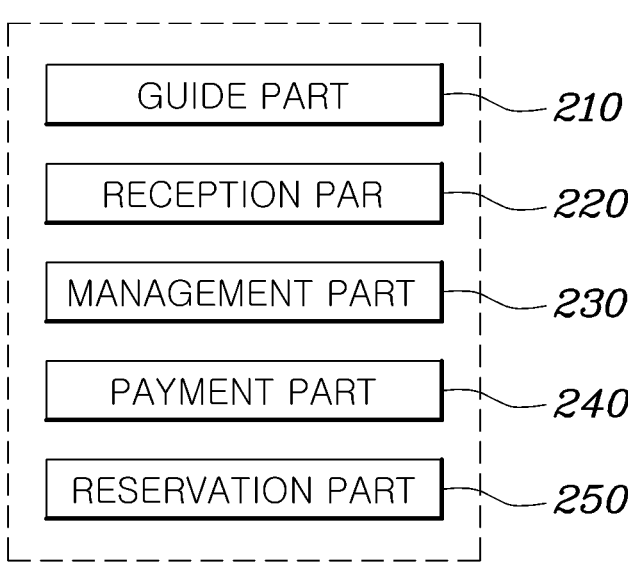
FIG. 2 is a view showing a configuration of a server of the office system where a vehicle is docked according to an embodiment of the present disclosure.

FIG. 2 is a view showing a configuration of the server 200 of the office system where a vehicle V is docked according to the embodiment of the present disclosure. Hereinafter, detailed configuration of the server 200 and a function of each detailed configuration will be described in detail.

Referring to FIG. 2, the server 200 may include at least one of a guide part 210, a reception part 220, a management part 230, a payment part 240, or a reservation part 250.

The server 200 may include a processor or CPU such that the guide part 210, the reception part 220, the management part 230, the payment part 240, and the reservation part 250 may be embedded therein as one unit.

The guide part 210 may check a use state of the station 110 and inform the user of a variety of information. When the vehicle V is docked at the station 110 or the station 110 is reserved in advance, the guide part 210 may determine that the station 110 is unavailable, and when the station 110 is empty, the guide part 210 may determine that the station 110 is available and guide the user to a location of the available station. When the station 110 is in use, the guide part 210 may inform the user of expected use end time of the station 110. In addition, when the user starts the use of the station 110 after the vehicle is docked at the station 110, the guide part 210 may inform the user of start time and end time of the use. Further, the guide part 210 may inform a user who has reserved the station in advance of reservation information.

The reception part 220 may allow the user to select the start time and end time of the use of the station 110, and to select the available station 110. The user selects the station 110 to occupy and use for a predetermined time through the reception part 220.

The management part 230 may manage the station 110. The management part 230 may manage and monitor whether the station 110 is in use or not, and when the use of the station being in use, management part 230 may manage and monitor expected end time. In addition, when the vehicle V is docked, the management part 230 may connect power and communication systems of the building 100 to the vehicle V so that the vehicle V may be completely connected to the building 100 so as to function as a part of the building 100. The start time and the end time of the use of the docked station 110 is counted thus the use time of the station 110 may be managed. In addition, air conditioning of the interior space of the vehicle V may be performed by an air conditioning system of the building 100.

The payment part 240 may calculate a fee of the use of the station 110 and process the payment. According to the use time from the docking start time to the docking end time, when the management part 230 counts the use time, the payment part 240 may calculate the fee on the basis of the use time and process the payment. In addition, when the user additionally uses the station 110, the payment part 240 may calculate an extra fee and process the payment.

The reservation part 250 may process a reservation of the use of the station 110. The user can reserve the use of the station 110 in advance through the user terminal 300, and the reservation part 250 may process the reservation on the basis of the reservation information input from the user terminal 300. The reservation information processed by the reservation part 250 may be transmitted to the guide part 210 and the management part 230. The reservation information may include use date, use time, and identification number of the vehicle V, etc. In addition, the reservation part 250 may transmit the above-described reservation information from the user terminal 300 to the payment part 240, and when a fee with respect to the reservation information is processed by the payment part 240 and the payment is completed, the reservation part 250 may complete reservation processing.

The user can input the reservation information to the reservation part 250 through the user terminal 300, and the reservation part 250 may process the use reservation of the station 110 on the basis of the reservation information input from the user terminal 300.

The reservation part 250 may inform the user of the guide information through the user terminal 300, the guide information including whether the docking of the vehicle V is possible or not, the start time and end time of the use of the station 110, and the reservation information, in accordance with the use state of the station 110.

Figure 3:
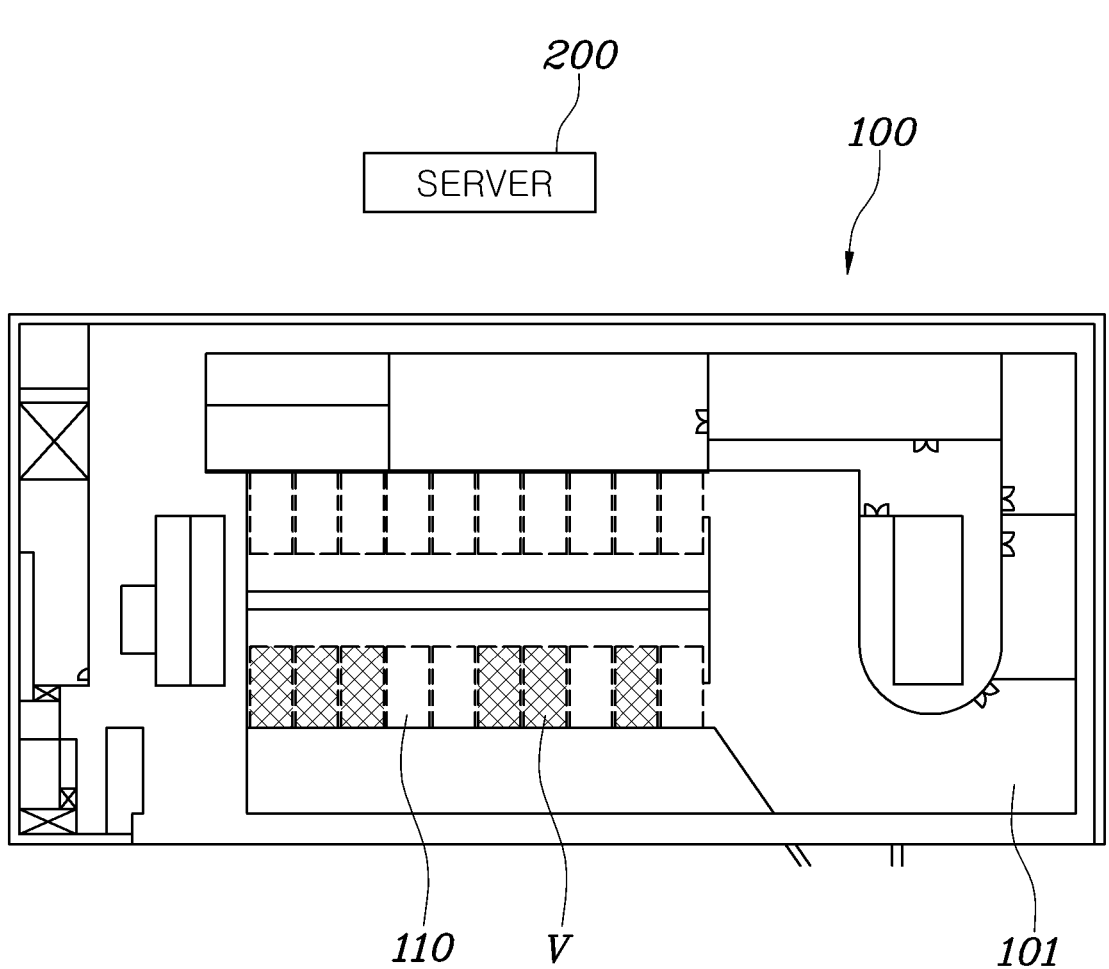
FIG. 3 is a plan view showing the office system where a vehicle is docked according to an embodiment of the present disclosure.

FIG. 3 is a plan view showing the office system where a vehicle V is docked according to an embodiment of the present disclosure.

As shown in FIG. 3, the station 110 is provided inside the building 100. When the vehicle V enters the building 100 and then is docked at the station 110, the vehicle V may be connected to the server 200. In this case, as the interior space of the vehicle V in a state of being parked inside the building 100 communicates with the building 100, the vehicle functions as the part of the building 100.

Further, the building 100 may have a common use space 101. The common use space 101 is an interior space that may be used by all users, such as meeting rooms, educational facilities, sports facilities, cafeterias, and rest rooms. The common use space 101 may be provided between stations 110 to ensure optimal movement of a plurality of docked vehicles V.

Accordingly, in the design of the building 100, when only the common use space 101 of the building 100 is designed and then the station 110 is installed at the building 100, as the vehicle V is docked at the station to configure each room, so that an owner of the building 100 can have an effect of reducing the construction costs. In addition, the user can have an effect of reducing the costs for interior construction and rent by docking the vehicle V equipped with facilities suitable for a purpose at the building 100 and using the common use space 101 of the building 100.

The server 200 may transmit information about a current use state of the station 110 and location information of the available station 110 to the user terminal 300. The user may receive information about various buildings 110 through the user terminal 300 and determine whether a proper station 110 is available, and may select the station 110 of the most proper building 100.

The office system according to the present disclosure may be used for company operations. An employee can make the vehicle V owned by the employee into a space suitable for work and personal preference of the employee, dock at the station 110 when goes to work, and separate the vehicle from the station 110 when leaves from work. The server 200 may manage docking start time of the vehicle V as attendance time of the employee and docking separation time thereof as finishing time thereof in order to manage time and attendance records of employees.

In addition, the office system of the present disclosure may be used to operate a store. The user can prepare the user's own vehicle V in a space suitable for the purpose, such as a cafeteria, restaurant, and shop, and the user can, for business, dock the vehicle at the station 110 to start the business. The server 200 may calculate a fee according to the use time of the station 110 of the user so that the building owner can earn rental income. The building owner can run the rental business simply through the management of the common use space 101 without managing each room. The user can be in business by renting a divided space in the building 100 for a predetermined period and owning only the vehicle V without having interior decorations suitable for the purpose.

According to the office system of the present disclosure, it is possible to realize a new business model that may efficiently utilize spaces.

Figure 4:
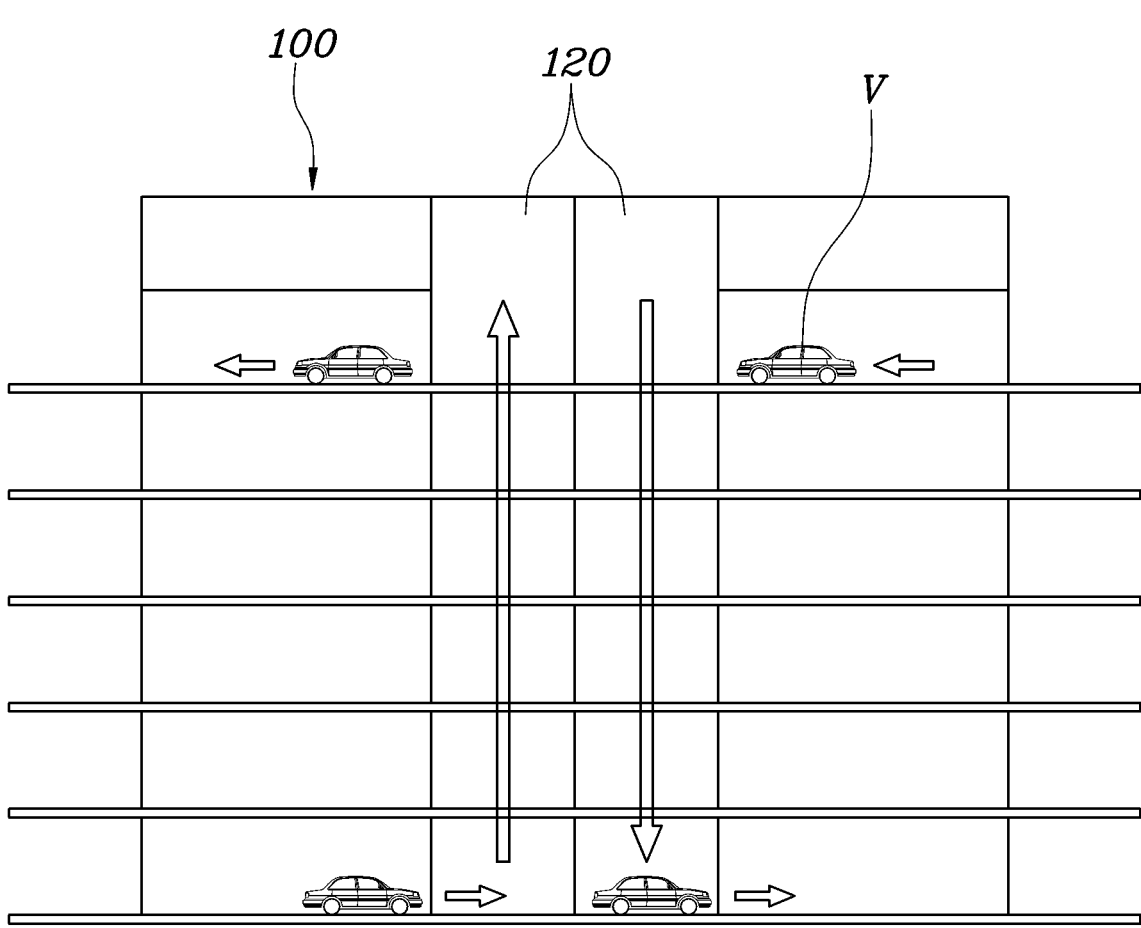
FIG. 4 is a sectional view showing the office system where a vehicle is docked according to an embodiment of the present disclosure.

FIG. 4 is a sectional view showing the office system where a vehicle V is docked according to an embodiment of the present disclosure. In the embodiment shown in FIG. 4, the station 110 is provided inside the building 100 and the building 100 has of a plurality of floors.

Referring to FIG. 4, the building 100 of the office system according to an embodiment of the present disclosure may be a building 100 having the plurality of floors. Since the station 110 is provided in each of the plurality of floors, the building 100 may have an elevator 120 where the vehicle V may board to move to the station 110. On order of arrival, the vehicle V may board the elevator 120 and be docked at the station 110 in a floor where the user wants to get off.

Figure 5:
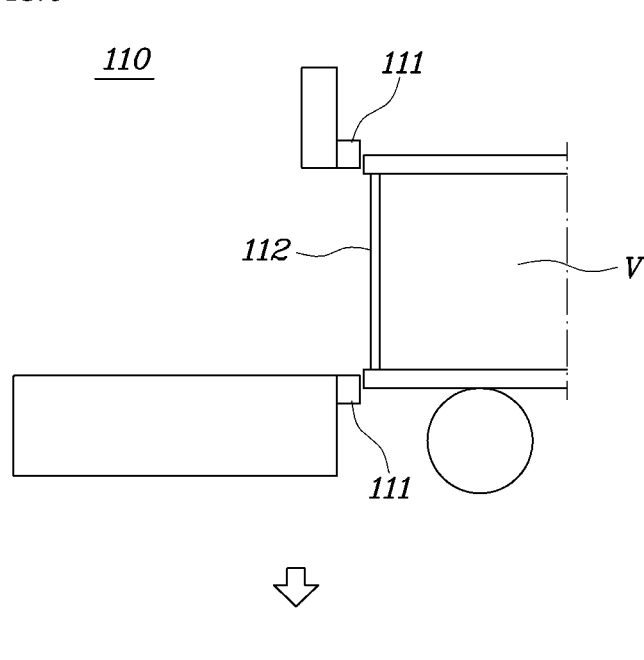
FIG. 5 is a view showing a state in which a vehicle is docked at the office system where a vehicle is docked according to an embodiment of the present disclosure.
Figure 5:
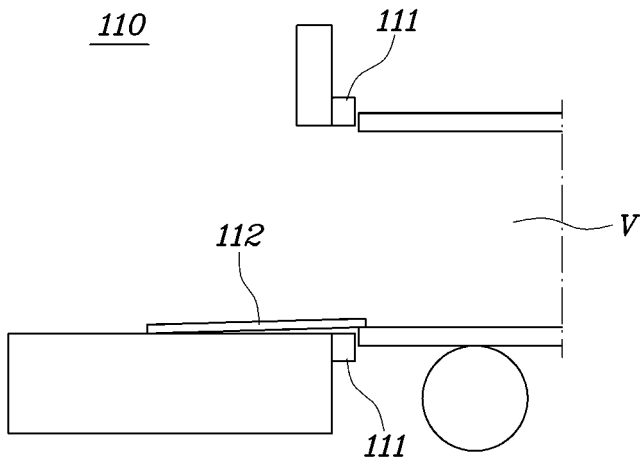

FIG. 5 is a view showing a state in which the vehicle V is docked at the office system where a vehicle V is docked according to an embodiment of the present disclosure.

Referring to FIG. 5, the station 110 is in a closed state by the gate 112 in normal when the vehicle V is not docked thereat. When the vehicle V is docked at the station 110, the gate 112 is brought into being positioned at a bottom of the station 110. The gate 112 may have a lamp.

In addition, a sealing member 111 is provided at an exterior wall of the station 110 to seal the station 110 by being in contact with a frame of the docked vehicle V. The sealing member 111 may be formed of a flexible material so as to seal a gap without damaging a vehicle body. A personal space may be protected by sealing between the exterior wall of the station 110 and the vehicle body firmly. The sealing member 111 may shield noise and block inflow of dust.

Figure 6:
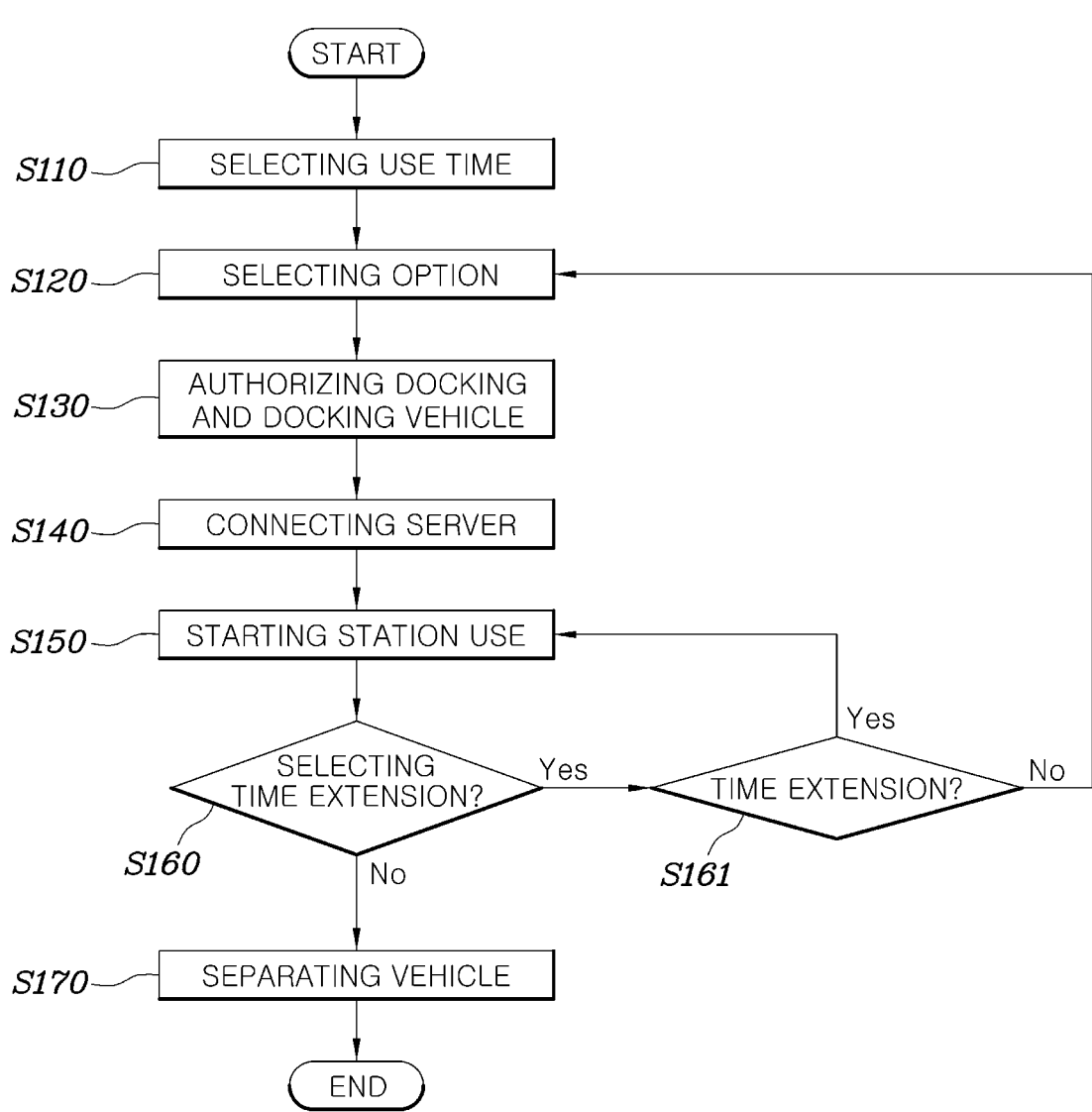
FIG. 6 is a flowchart showing a control method of the office system where a vehicle is docked according to a first embodiment of the present disclosure.

FIG. 6 is a flowchart showing a control method of the office system where a vehicle V is docked according to a first embodiment of the present disclosure. The office system control method according to the first embodiment is a case where the user does not need to pay for the use of the station 110, such as in a case of a company operation system. The first embodiment of the office system may include selecting time S110, selecting option S120, docking S130, connecting S140, using a station S150, and separating a vehicle S170.

In the selecting the time S110, a user can determine a use time of a station 110. The user can select start time and end time of use of the station 110. Even when the station 110 is not currently available, the user can reserve the station 110 in advance. In the case of employees, the start time of use may be considered as the attendance time and the end time of use may be considered as the finishing time.

In the selecting the option S120, the user can select options with respect to a location, size, and type of the station 110. In the case of employees, when a designated location is not prepared for the employees, the employees can select an available station 110 according to the desired working position, size, and type, and the selected station 110 becomes the working location. When the user does not select the station 110, the station 110 may be randomly selected.

In the docking S130, the docking of the vehicle V owned by the user is authorized to the selected station 110, and the vehicle V may be docked thereat. The station 110 may include a number recognition parts capable of recognizing a license plate of a vehicle V to authorize the docking of a designated vehicle V, and to reject the docking of a vehicle V with an undesignated license plate. In the case of employees, when the docking S130 is completed, the docking may be considered as the employees go to work.

In the connecting S140, the docked vehicle V and the server 200 are connected to each other in a wired or wireless manner. As the power and communication systems of the building 100 are connected to the vehicle V, the user can use the power and communication systems of the building 100 in the interior space of the vehicle V. In the connecting S140, the vehicle V and the air conditioning system of the building 100 may be connected to each other.

In the using the station S150, the user can use the station 110. When the station 110 is in use, another user cannot select the station 110, and can check information about end time of use of the station 110 to use the station 110 after the end time.

In the separating the vehicle S170, the user can finish the use of the station 110, and release the docking of the vehicle V to separate the vehicle V from the station 110. When the use end time comes, the docking of the vehicle V is released, and when the vehicle V is separated from the station 110, the use may be processed as finished. In the case of employees, the employee may be considered to have left work at a moment when the dock is released.

It may happen that the user wants to use the station 110 additionally after the use end time of the station 110. In selecting time extension S160, after the using the station S150, the user can select extension of the use time of the station 110. The user can extend the use end time for adding use time, since reservation for the station 110 may exist, the user can determine whether the station 110 is available additionally S161, and as a result, when additional use is possible, the user can move to the using the station S150 where the station 110 is used. However, when the additional use of the station 110 is impossible, the use can select options for use of another station 110 to select an available station 110. In the case of employees, when the use time is added, the employee may be considered to work overtime.

The server 200 may include a database for managing and storing the use start time, use end time, and additional use time of the station 110. Time and attendance of employees may be managed by managing records of the database, thus an employer can reduce the effort and costs of operating the company.

Figure 7:
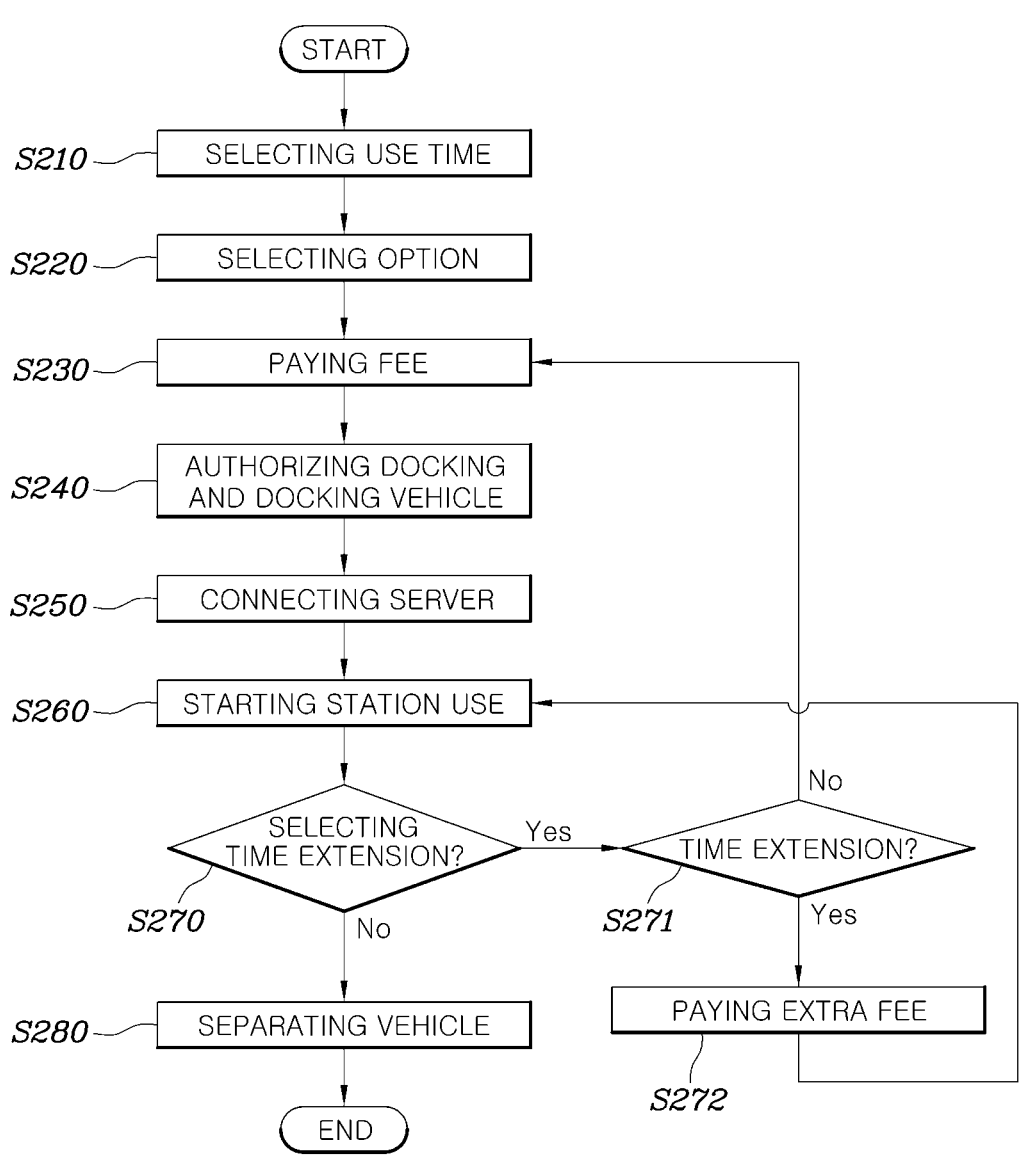
FIG. 7 is a flowchart showing the control method of the office system where a vehicle is docked according to a second embodiment of the present disclosure.

FIG. 7 is a flowchart showing the control method of the office system where a vehicle V is docked according to a second embodiment of the present disclosure. The control method of the office system according to the second embodiment is a case in which a user needs to pay for the use of the station 110, as in the case of a system of operating a commercial building. Referring to FIG. 7, the second embodiment of the office system may include selecting time S210, selecting option S220, paying S230, docking S240, connecting S250, using a station S260, and separating a vehicle S280.

Compared to the control method of the office system according to the first embodiment, the control method of the office system according to the second embodiment may further include the paying S230 after the selecting the option S220 and paying of an extra fee S272 after determining extendibility S271.

In the selecting the time S210, the user can select use time of the station 110 for business, and in the selecting the option S220, the user can select options of the station 110, such as a suitable location, size, and type, according to the type of business or the station 110 may be randomly selected. In the paying S230 after the selecting the option S220, the user can pay for use of the selected station 110. That is, a business owner pays for rent of the station 110.

In the docking S240, the vehicle V may be docked at the station 110, and in the connecting S250, the vehicle V and the building 100 may be connected to each other. In the using the station S260, the user can start business at the station 110. The business owner can end the business at the use end time, and separate the vehicle V from the station 110, and when the business owner wants additional use, the business owner may select the additional use of the station 110 in use in selecting extension S270.

When the business owner selects the additional use of the station 110 in use, it is determined whether the extension of the use time of the station 110 is possible or not S271, and as a result, when the additional use is possible, the business owner can pay the extra fee for the additional use in the paying of the extra fee S272. When the additional use of the station 110 in use is impossible, the business owner can select options for use of another station 110. What is not described in the control method according to the second embodiment is the same as the control method according to the first embodiment.

Hereinafter, in the office system where a vehicle V is docked and the control method thereof according to the present disclosure, only the station 110 is prepared in the building 100 without having facilities according to a specific purpose for each space, thus the user can use the desired space by docking the vehicle V so that it is possible to realize efficient space utilization.

Although exemplary embodiments of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A system for connecting a vehicle to a building, wherein the vehicle functions as a space of the building when the vehicle is connected to the building, the system comprising:

the building;

at least one station inside or outside of the building to allow the vehicle to connect the at least one station, and a server configured to:

check whether the at least one station is available, allow a user to select a station for the vehicle, select the station randomly when the user does not select the station, when the vehicle is connected at the selected station after the vehicle of the user is authorized to the selected station, connect to the vehicle in a wired or wireless manner and manage use of the selected station, wherein the station is provided with a gate, and wherein the vehicle and the station are connected by contact between the gate and a frame that forms an entrance of the vehicle, and wherein the server comprises a processor configured to perform connecting the vehicle to a power outlet and communication systems of the building when the vehicle is connected.

2. The system of claim 1, wherein, when the selected station is located at the inside of the building and the vehicle is connected at the inside of the building, the vehicle is connected to the server.

3. The system of claim 1, wherein a processor is further configured to perform at least one of:

informing the user of guide information in accordance with a use state of the selected station, wherein the guide information includes whether connecting of the vehicle is possible or not, a start time and an end time of use of the selected station, and reservation information, managing use of the selected station when the vehicle is connected, counting the end time of use of the selected station to which the vehicle is connected, calculating a fee according to a use time of the user and a processing payment, or processing a reservation for use of the selected station.

4. The system of claim 3, wherein the processor is configured to process the reservation for use of the selected station on the basis of the reservation information inputted from a user terminal.

5. The system of claim 3, wherein the processor is configured to inform a user terminal of the reservation information.

6. The system of claim 1, wherein the building has a common use space defined between a plurality of stations and configured to be shared by users.

7. The system of claim 1, wherein the vehicle connected at the selected station includes a connector configured to connect the vehicle to the selected station.

8. The system of claim 1, wherein the building comprises a plurality of floors, each floor having the at least one station, and wherein the building includes an elevator configured to board and transport the vehicle between the plurality of floors.

* * * * *